(12) United States Patent
Kobayashi (10) Patent No.: US 9,931,828 B2
(45) Date of Patent: Apr. 3, 2018

(54) THREE-DIMENSIONAL PRINTING DEVICE

(71) Applicant: Roland DG Corporation, Hamamatsu-shi, Shizuoka (JP)

(72) Inventor: Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 404 days.

(21) Appl. No.: 14/928,225

(22) Filed: Oct. 30, 2015

(65) Prior Publication Data
US 2016/0121547 A1 May 5, 2016

(30) Foreign Application Priority Data

Oct. 31, 2014 (JP) .................................. 2014-222525

(51) Int. Cl.
*B29C 67/00* (2017.01)
*B33Y 30/00* (2015.01)
*B33Y 50/02* (2015.01)

(52) U.S. Cl.
CPC .......... *B33Y 30/00* (2014.12); *B29C 67/0066* (2013.01); *B29C 67/0088* (2013.01); *B33Y 50/02* (2014.12)

(58) Field of Classification Search
CPC ......... B33Y 50/02; B33Y 30/00; B33Y 10/00; B29C 64/00; B29C 64/20; B29C 64/264; B29C 64/282; B29C 64/393
See application file for complete search history.

(56) References Cited

U.S. PATENT DOCUMENTS

| | | | | |
|---|---|---|---|---|
| 6,841,340 | B2 * | 1/2005 | Tani ...................... | B29C 64/135 |
| | | | | 264/494 |
| 9,833,952 | B2 * | 12/2017 | Kobayashi .............. | B29C 64/20 |
| 9,862,147 | B2 * | 1/2018 | Jeng ...................... | B29C 64/124 |
| 2002/0155189 | A1 | 10/2002 | John | |

FOREIGN PATENT DOCUMENTS

JP    2003-39564 A    2/2003

* cited by examiner

*Primary Examiner* — Joseph S Del Sole
*Assistant Examiner* — Thu Khanh T. Nguyen
(74) *Attorney, Agent, or Firm* — Keating & Bennett, LLP (57) ABSTRACT

A three-dimensional printing device includes an optical device and a controller that controls the optical device. The controller includes a dividing section that divides an area of a vat that is irradiated with light of a projector into a plurality of blocks, a counting section that counts a number of times of irradiation with light of the projector, a first determination section that determines whether or not the number of times counted by the counting section has reached a predetermined threshold value, a light output section that changes when it is determined by the first determination section that the number of times has reached the predetermined threshold value from a first energy to a second energy lower than the first energy an energy of light to be output from the projector to the photo-curable resin of the block for which determination has been made.

6 Claims, 10 Drawing Sheets

THREE-DIMENSIONAL PRINTING DEVICE

The present application claims priority to Japanese Patent Application No. 2014-222525, filed on Oct. 31, 2014, the disclosure of which is hereby incorporated by reference in its entirety.

BACKGROUND OF THE INVENTION

1. Field of the Invention

The present invention relates to a three-dimensional printing device.

2. Description of the Related Art

There are conventional three-dimensional printing devices for printing a three-dimensional printed object by irradiating a liquid photo-curable resin contained in a vat with light and curing the photo-curable resin.

A three-dimensional printing device of this type prepares cross-sectional shapes of a three-dimensional printed object, and cures the photo-curable resin so as to successively deposit resin layers whose shapes correspond to the cross-sectional shapes, thereby printing the three-dimensional printed object. As shown in Japanese Laid-Open Patent Publication No. 2003-39564, for example, a three-dimensional printing device includes a platform with an opening therein, a resin vat placed on the platform and containing a photo-curable resin therein, and a holder that is disposed above the vat and can be moved up and down. An optical device disposed below the platform, includes a light source outputting light, a mirror, etc. Light output from the light source is reflected by the mirror and passes through the opening of the platform, irradiating the photo-curable resin in the vat. A portion of the photo-curable resin contained in the vat that is irradiated with light cures.

By controlling the position of light irradiation, it is possible to appropriately change the position at which the resin cures, and thus to form a resin layer having a desired cross-sectional shape. By successively raising the holder, desired cross-sectional shapes are formed continuously in a downward direction. Thus, it is possible to print a desired three-dimensional printed object.

Now, when printing three-dimensional printed objects using the same resin vat over a long period of time, portions of the vat that are irradiated with light may become clouded white (hereinafter this will be referred to as "clouding"). When the clouded vat is irradiated with light in order to cure the photo-curable resin in the vat, the light is partially blocked by the clouded portions of the vat, thereby failing to appropriately cure portions of the photo-curable resin around the clouded portions of the vat. Then, an intended cross-sectional shape may not be formed, and the quality of the printed object may lower.

SUMMARY OF THE INVENTION

Preferred embodiments of the present invention provide a three-dimensional printing device with which it is possible to prevent clouding of a resin vat.

The inventor of the present application discovered that a resin vat becomes clouded for the following reason. A plurality of minute holes are formed in the surface of the resin vat. If the photo-curable resin is irradiated with light from the light source with the photo-curable resin inside the minute holes, the photo-curable resin cures partly inside the minute holes. Then, when the cured resin is pulled up out of the vat, the photo-curable resin cured inside the holes is pulled out of the holes. If the hardness of the photo-curable resin inside the holes is too high, the cured photo-curable resin may scratch the surface of the vat when being pulled out. The vat becomes clouded due to such scratches. In view of this, the inventor of the present application discovered that if the photo-curable resin cured inside the minute holes has a hardness such that the photo-curable resin is easily pulled out of the holes, it is possible to prevent the vat from being scratched and to thus prevent the clouding of the vat as a result. It was also discovered that in cases where the same area of the vat is irradiated with light for a large number of times in a single printing process, the photo-curable resin cures sufficiently even if the energy of light to be output is weakened if the number of times of irradiation exceeds a certain number. That is, if the same position is repeatedly irradiated with light of the same intensity, the photo-curable resin may be cured excessively even if the energy of light (irradiation intensity) for each iteration is necessary and sufficient to cure a single layer of the photo-curable resin and is an appropriate amount of energy that is neither too low nor too high. The inventor of the present application discovered that it is possible to prevent the clouding of the vat by adjusting the energy of light from the light source and changing the energy of light to be output to the photo-curable resin.

A three-dimensional printing device according to a preferred embodiment of the present invention is a three-dimensional printing device for printing a three-dimensional printed object by preparing cross-sectional shapes of the three-dimensional printed object and curing a photo-curable resin so as to successively deposit resin layers of the cross-sectional shapes, the three-dimensional printing device including a vat made of a resin material and containing the photo-curable resin therein; an optical device disposed below the vat and including at least a light source outputting light, irradiating the photo-curable resin contained in the vat with light from the light source; and a controller configured or programmed to control the optical device. The controller is configured or programmed to include a dividing section that divides an area of the vat that is irradiated with light from the light source into a plurality of blocks; a counting section that counts a number of times each of the blocks divided by the dividing section has been irradiated with light from the light source; a first determination section that determines whether or not the number of times counted by the counting section has reached a predetermined threshold value; and a light output section that, when it is determined by the first determination section that the number of times has not reached the threshold value, sets to a first energy, an energy of light to be output from the light source to the photo-curable resin of the block for which determination has been made, whereas when it is determined by the first determination section that the number of times has reached the predetermined threshold value, the light output section changes, from the first energy to a second energy lower than the first energy, the energy of light to be output from the light source to the photo-curable resin of the block for which determination has been made.

With a three-dimensional printing device of a preferred embodiment of the present invention, for blocks of the vat that are irradiated with light from the light source for a larger number of times when printing a three-dimensional printed object, the energy of light is changed to the second energy lower than the first energy by the light output section when the number of times of light irradiation exceeds a predetermined threshold value. For example, the predetermined threshold value is the number of times of light irradiation such that even when the energy of light is changed from the first energy to the second energy lower than the first energy, the photo-curable resin contained in the vat cures sufficiently with the second energy. Thus, with the light output section adjusting the energy of light from the light source, it is possible to prevent the photo-curable resin from curing excessively for blocks that are irradiated with light for a larger number of times. That is, even for blocks that are irradiated with light for a larger number of times, it is possible to sufficiently cure the photo-curable resin, and also to prevent the photo-curable resin from curing excessively, scratching the vat.

According to various preferred embodiments of the present invention, it is possible to provide a three-dimensional printing device with which it is possible to prevent the clouding of the resin vat.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Three-dimensional printing devices according to preferred embodiments of the present invention will now be described with reference to the drawings. Preferred embodiments described herein are not intended to limit the scope of the present invention. Members or portions serving the same function are denoted by the same reference numerals, and redundant descriptions will be omitted or simplified.

Figure 1:
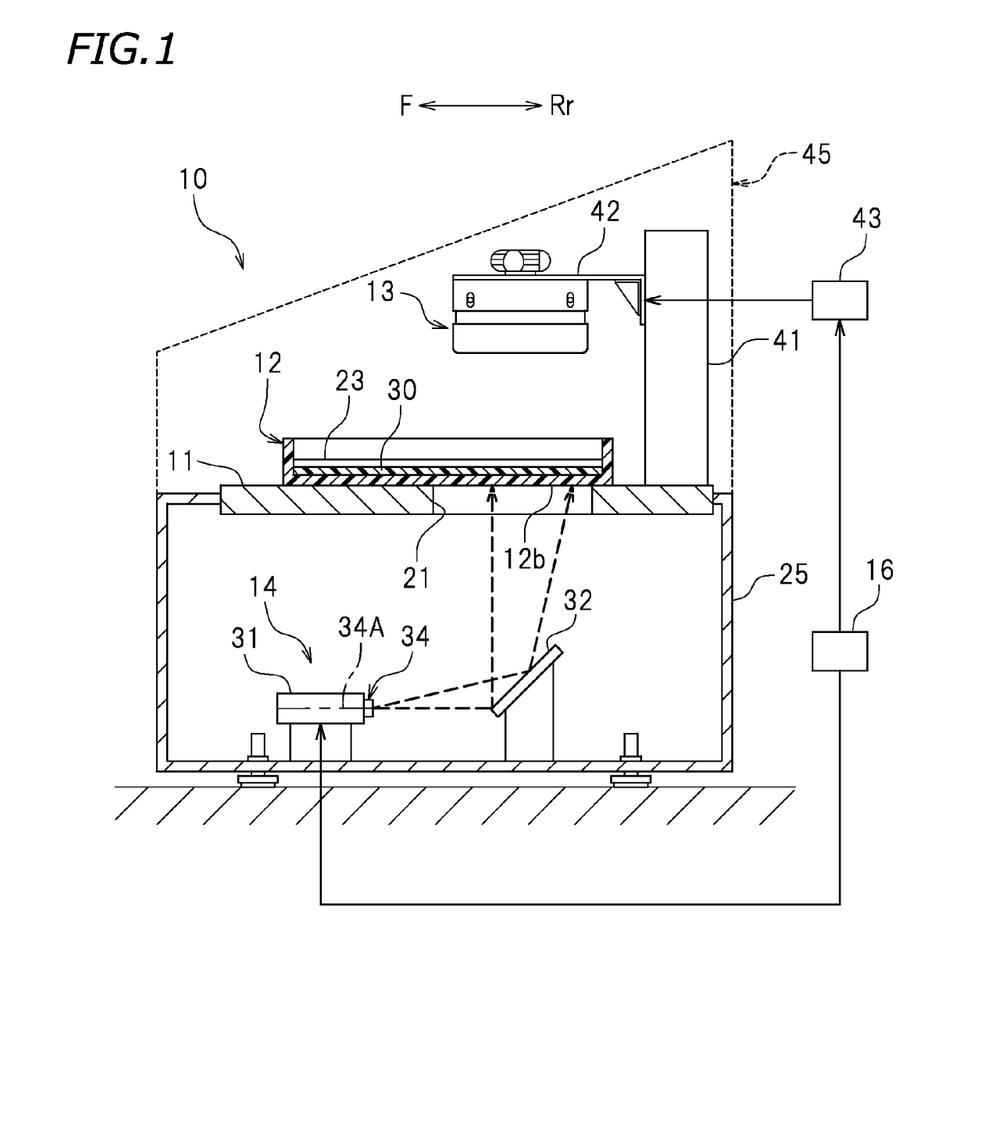
FIG. 1 is a cross-sectional view of a three-dimensional printing device according to a preferred embodiment of the present invention.
Figure 2:
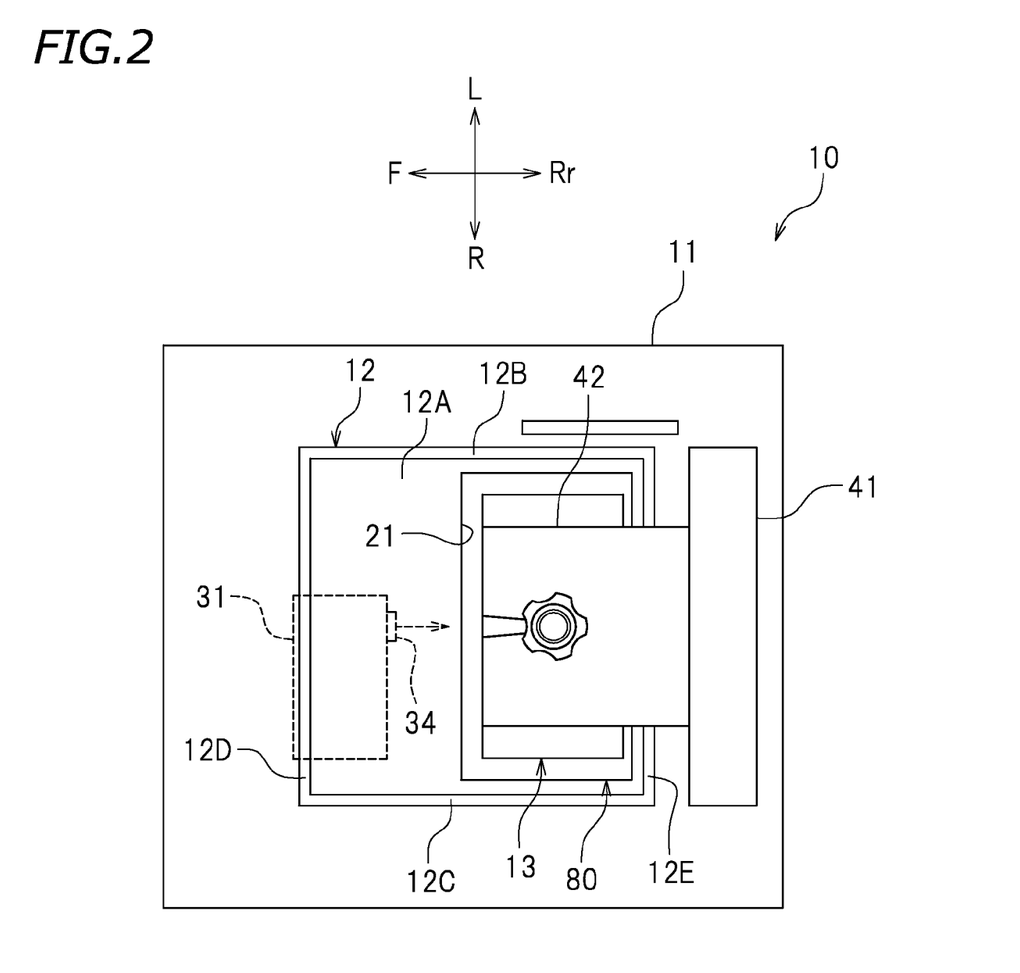
FIG. 2 is a plan view of the three-dimensional printing device according to a preferred embodiment of the present invention.

FIG. 1 is a cross-sectional view of a three-dimensional printing device 10 according to the present preferred embodiment. FIG. 2 is a plan view of the three-dimensional printing device 10. Note that left and right in FIG. 1 are assumed to correspond to front and rear, respectively, of the three-dimensional printing device 10, unless otherwise specified. Up, down, left and right in FIG. 2 are assumed to correspond to left, right, front and rear, respectively, of the three-dimensional printing device 10. The reference signs F, Rr, L and R, as used in the figures, refer to front, rear, left and right, respectively. Note however that these are merely for the purpose of illustration, and are not intended to impose any limitation on how the three-dimensional printing device 10 is installed.

The three-dimensional printing device 10 prepares cross-sectional shapes of a three-dimensional printed object, and cures a liquid photo-curable resin so as to successively deposit resin layers whose shapes correspond to the cross-sectional shapes, thus printing the three-dimensional printed object. The term "cross-sectional shape" refers to the shape of a cross section of a horizontal slice having a predetermined thickness (e.g., about 0.1 mm) of a three-dimensional printed object. The term "photo-curable resin" refers to a resin that cures when irradiated with light containing a predetermined wavelength.

As shown in FIG. 1, the three-dimensional printing device 10 includes a platform 11, a vat 12, a holder 13, an optical device 14, a controller 16, and a case 25.

As shown in FIG. 1, the platform 11 is supported by the case 25. The platform 11 has an opening 21 therein. The opening 21 is an area through which light for irradiating a photo-curable resin 23 is allowed to pass. There is no particular limitation on the shape of the opening 21. In the present preferred embodiment, the opening 21 is preferably rectangular or substantially rectangular as seen from above, as shown in FIG. 2.

As shown in FIG. 1, the vat 12 contains the liquid photo-curable resin 23. The vat 12 is placed on the platform 11. The vat 12 is disposed so that it can be attached to the platform 11. As shown in FIG. 2, the vat 12 is a container having a rectangular or substantially rectangular or substantially rectangular shape as seen from above. The vat 12, placed on the platform 11, covers the opening 21 of the platform 11. The vat 12 overlaps with the opening 21 of the platform 11 as seen from above. The vat 12 includes a bottom wall 12A having a rectangular or substantially rectangular shape as seen from above, and includes a left side wall 12B, a right side wall 12C, a front side wall 12D and a rear side wall 12E standing upright at the left edge, the right edge, the front edge and the rear edge of the bottom wall 12A, respectively. When the vat 12 is placed on the platform 11, a portion of the bottom wall 12A is located above the opening 21 of the platform 11. Herein, a rear portion of the bottom wall 12A is located above the opening 21. The entire bottom wall 12A may be located above the opening 21 of the platform 11. At least the bottom wall 12A of the vat 12 is preferably formed by a material capable of transmitting light therethrough, e.g., a transparent resin material. In the present preferred embodiment, the entire vat 12 is preferably formed by a resin material. The entire vat 12 is preferably formed by an acrylic resin, for example. A silicone layer 30 is provided on the surface of the bottom wall 12A of the vat 12. The silicone layer 30 prevents the photo-curable resin 23 from adhering to the bottom wall 12A.

As shown in FIG. 1, the holder 13 is disposed above the vat 12. The holder 13 is disposed above the opening 21 of the platform 11. As shown in FIG. 2, the holder 13 preferably has a rectangular or substantially rectangular shape as seen from above. There is no particular limitation on the shape of the holder 13. The holder 13 is a member that can be moved up and down. The holder 13 pulls up, out of the vat 12, the photo-curable resin 23 that has been cured by the irradiation with light from a projector 31 of the optical device 14. The holder 13 is configured so that when the holder 13 is lowered, the holder 13 is immersed in the photo-curable resin 23 in the vat 12. The holder 13 has a structure such that when the holder 13 is raised, the holder 13 lifts the photo-curable resin 23 having been cured by the irradiation of light. As shown in FIG. 1, the platform 11 is provided with a post 41 extending in the up-down direction. A slider 42 is attached forward of the post 41. The slider 42 is movable moved up and down along the post 41, and is moved upward or downward by a motor 43. The holder 13 is attached to the slider 42. The holder 13 is moved upward or downward by the motor 43. The post 41 indirectly supports the holder 13, via the slider 42, so that the holder 13 is able to be moved up and down. Note however that the post 41 may directly support the holder 13. The holder 13 is disposed forward of the post 41.

As shown in FIG. 1, the optical device 14 is disposed below the platform 11. The optical device 14 irradiates the liquid photo-curable resin 23 contained in the vat 12 with light of a predetermined wavelength. The optical device 14 includes the projector 31 and a mirror 32. The optical device 14 is accommodated in the case 25 provided below the platform 11. The optical device 14 is supported by the case 25.

As shown in FIG. 1, the projector 31 is an example of a light source that outputs light. Note however that the light source of the optical device 14 is not limited to the projector 31. In the present preferred embodiment, the projector 31 is disposed below a front portion of the platform 11. The projector 31 is disposed forward of the holder 13. The projector 31 includes a lens 34. The lens 34 is disposed rearward of the projector 31. Light is output in the front-to-rear direction through the lens 34. There is no particular limitation on the direction in which the projector 31 projects light. Herein, the amount of light output from the projector 31 toward above a horizontal plane that passes through an optical axis 34A of the lens 34 is greater than the amount of light output from the projector 31 toward below the horizontal plane.

As shown in FIG. 1, the mirror 32 reflects light from the projector 31 toward the vat 12. The mirror 32 is disposed below the opening 21 in the platform 11. The mirror 32 is disposed rearward of the projector 31. The mirror 32 is disposed so that the mirror 32 and the projector 31 are next to each other in the front-rear direction. The mirror 32 is disposed to be inclined with its front side lowered. Light output from the projector 31 is reflected by the mirror 32 to pass through the opening 21 of the platform 11, irradiating the photo-curable resin 23 in the vat 12. Now, prior to printing a three-dimensional printed object, there is a need for adjusting the light output direction so that the light output from the projector 31 entirely passes through the opening 21. Prior to printing a three-dimensional printed object, the light output direction is adjusted by adjusting the position of the projector 31 in the present preferred embodiment, but the light output direction may be adjusted by adjusting the angle of the mirror 32.

As shown in FIG. 1, the three-dimensional printing device 10 may be provided with a cover 45. The cover 45 is a member that covers the vat 12, the holder 13, the post 41, and others, which are disposed above the platform 11. The cover 45 makes it unlikely that dust, or the like, comes into the photo-curable resin 23 in the vat 12 from outside. The cover 45 also prevents the output light from leaking to the outside. The cover 45 is preferably formed by a material that blocks light containing such a wavelength that cures the photo-curable resin 23. The cover 45 may be an opaque cover.

Next, the controller 16 will be described. The controller 16 is connected to the motor 43 that moves up and down the slider 42 with the holder 13 attached thereto. The controller 16 is connected to the projector 31 of the optical device 14. The controller 16 controls the motor 43. The controller 16 drives the motor 43, thus moving the slider 42 and the holder 13 upward or downward. The controller 16 controls the projector 31 of the optical device 14. The controller 16 controls the energy, luminosity, amount, wavelength band, shape, position of irradiation, and timing, etc., of the light output from the projector 31. There is no particular limitation on the configuration of the controller 16. For example, the controller 16 may be a computer, and may include a central processing unit (hereinafter referred to as a CPU), a ROM storing a program to be executed by the CPU, a RAM, etc.

Figure 3:
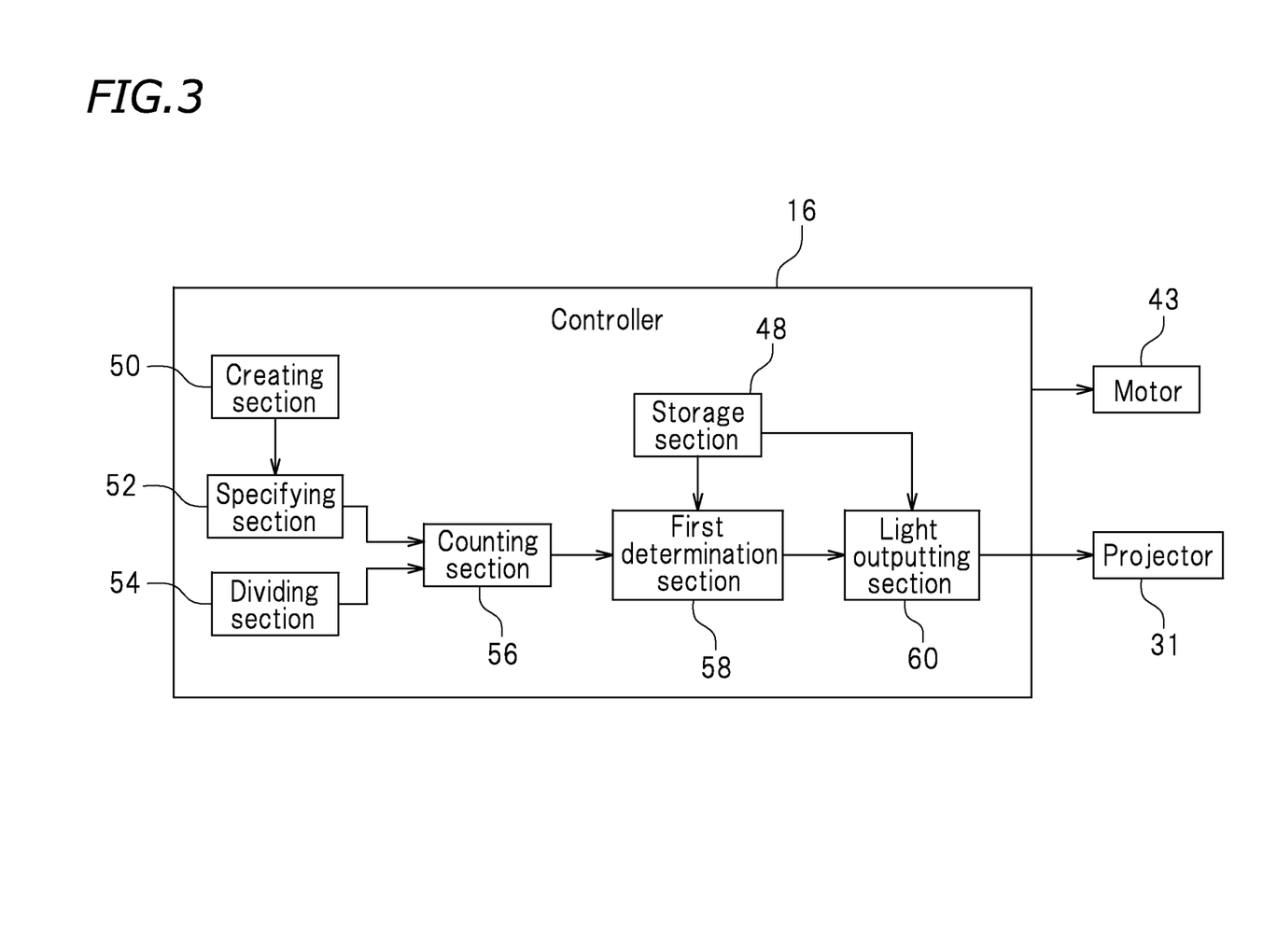
FIG. 3 is a block diagram showing primary components according to a preferred embodiment of the present invention.

As shown in FIG. 3, the controller 16 is configured or programmed to include a storage section 48, a creating section 50, a specifying section 52, a dividing section 54, a counting section 56, a first determination section 58, and a light outputting section 60.

The creating section 50 creates cross-sectional shapes of a three-dimensional printed object to be printed by the three-dimensional printing device 10. The creating section 50 creates slice data, which is a data version of each cross-sectional shape. Note that the controller 16 may include no creating section 50. In such a case, the data of cross-sectional shapes may be created in advance by a personal computer, or the like, or it may be existing data of cross-sectional shapes that is distributed.

Figure 4:
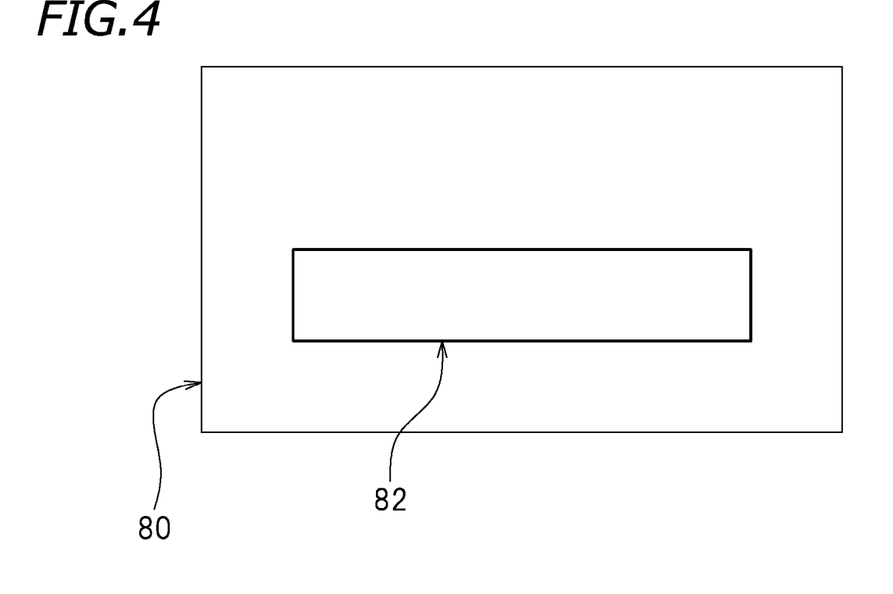
FIG. 4 is a diagram showing an example of a to-be-printed area specified within the print area of the vat which is available to be irradiated with light.

As shown in FIG. 4, based on the data of each cross-sectional shape having been created by the creating section 50, the specifying section 52 determines a to-be-printed area 82 which is actually to be irradiated with light of the projector 31 within a print area 80 of the vat 12 (see also FIG. 2) which is available to be irradiated with light of the projector 31. As shown in FIG. 2, the print area 80 is an area of the vat 12 that overlaps with the opening 21.

Figure 5:
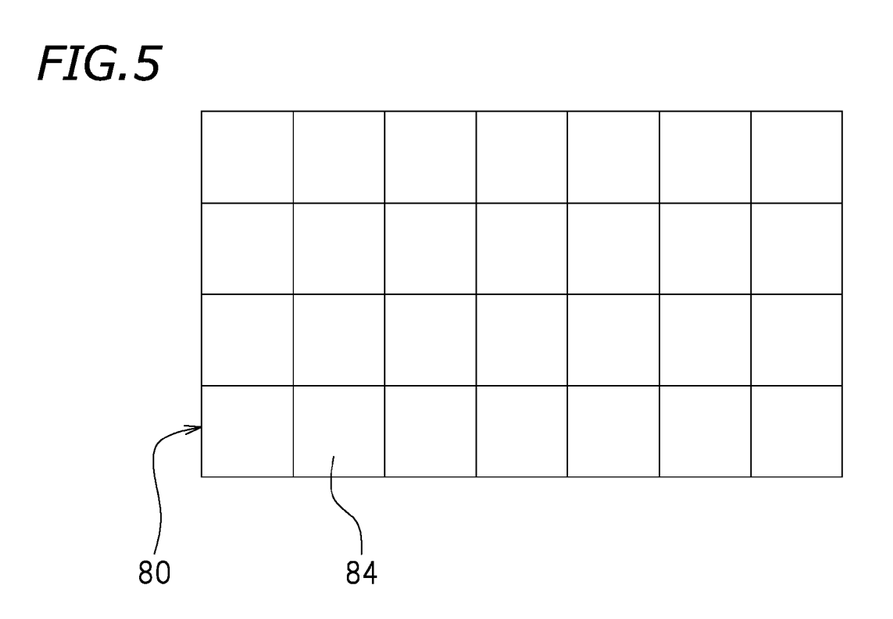
FIG. 5 is a diagram showing an example in which the print area of the vat which is available to be irradiated with light is divided into a plurality of blocks.

As shown in FIG. 5, the dividing section 54 divides the print area 80 (see also FIG. 2) into a plurality of blocks 84. The dividing section 54 divides the print area 80 into a plurality of blocks 84 of a lattice pattern. How the print area 80 is divided is determined in advance. There is no particular limitation on how the print area 80 is divided. The print area 80 is preferably divided into a larger number of blocks 84.

For each of the blocks 84 divided by the dividing section 54, the counting section 56 counts the number of times the block 84 has been irradiated with light of the projector 31. The counting section 56 counts the number of times each block 84 has been irradiated with light, from beginning to end of the process of printing a three-dimensional printed object.

For each of the blocks 84, the first determination section 58 determines whether or not the number of times counted by the counting section 56 has reached a predetermined threshold value. The predetermined threshold value is determined in advance. In the present preferred embodiment, the predetermined threshold value is stored in advance in the storage section 48 of the controller 16. For example, the predetermined threshold value is the number of times of light irradiation such that even when the energy of light is changed from a first energy to a second energy lower than the first energy, the photo-curable resin 23 contained in the vat 12 cures sufficiently with the second energy.

The light outputting section 60 adjusts the energy of light output from the projector 31 of the optical device 14. When it is determined by the first determination section 58 that the number of times counted by the counting section 56 has not reached the predetermined threshold value, the light outputting section 60 sets, to the first energy, the energy of light to be output from the projector to the photo-curable resin 23 of the block 84 for which determination has been made.

When it is determined by the first determination section 58 that the number of times counted by the counting section 56 has reached the predetermined threshold value, the light outputting section 60 changes, from the first energy to the second energy, the energy of light to be output from the projector 31 to the photo-curable resin 23 of the block 84 for which determination has been made.

The second energy is lower than the first energy. The first energy is the normal energy of light to be output from the projector 31 to the photo-curable resin 23 contained in the vat 12 (the energy of light to be output during normal operation). When starting to print a three-dimensional printed object, the light outputting section 60 sets the energy of light to be output from the projector 31 to the first energy for all the blocks 84. The first energy and the second energy are determined in advance. Information regarding the first energy and the second energy is stored in advance in the storage section 48 of the controller 16. Where the first energy is A [mW] and the second energy is B [mW], the second energy B is preferably about 0.7 A [mW] to about 0.9 A [mW], for example.

After changing from the first energy to the second energy, the energy of light to be output from the projector 31 to the photo-curable resin 23 of the block 84 for which determination has been made, the light outputting section 60 may lower the energy of light from the projector 31 from the second energy in a stepwise manner as the number of times the block 84 for which determination has been made has been irradiated with light of the projector 31 increases. The light outputting section 60 may lower the energy of light from the projector 31 each time the number of times the block 84 for which determination has been made has been irradiated increments by one. The light outputting section 60 may lower the energy of light from the projector 31 each time the number of times the block 84 for which determination has been made has been irradiated increases by a predetermined number (e.g., by 5).

After changing, from the first energy to the second energy, the energy of light to be output from the projector 31 to the photo-curable resin 23 of the block 84 for which determination has been made, the light outputting section 60 may irradiate the photo-curable resin 23 of the block 84 for which determination has been made only with light having the second energy.

Figure 6:
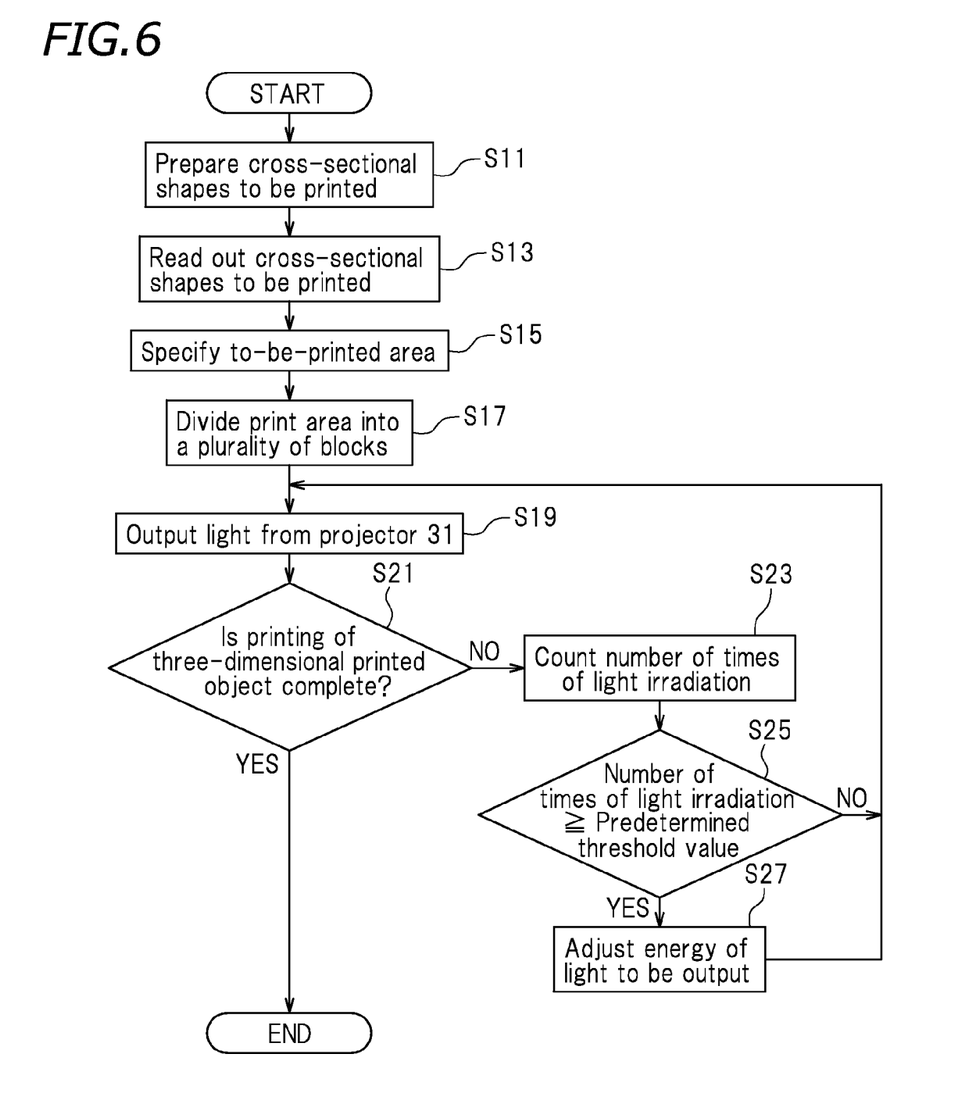
FIG. 6 is a flow chart showing the flow of a process of adjusting the energy of light to be output from the projector according to a preferred embodiment of the present invention.
Figure 7:
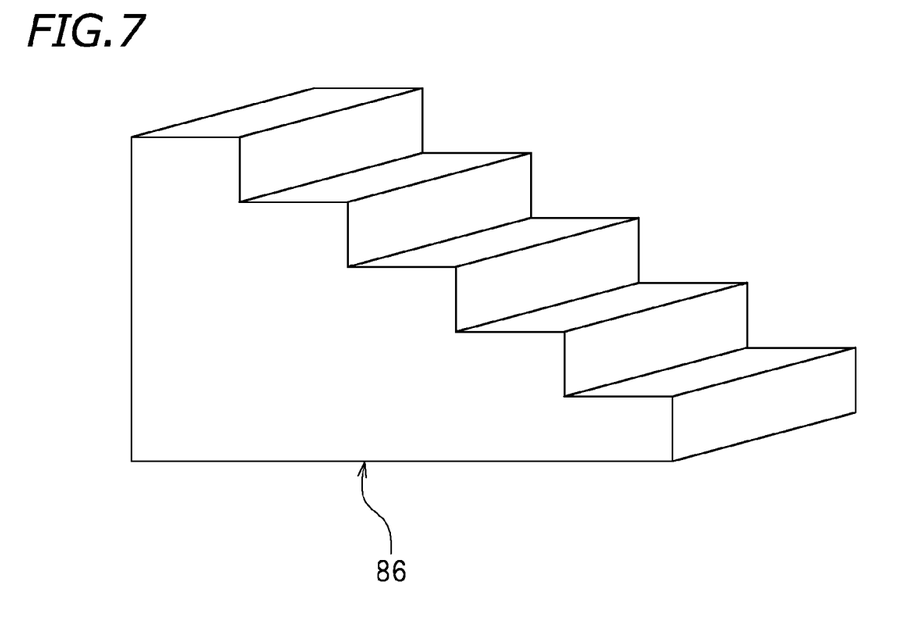
FIG. 7 is a perspective view showing a structure of a three-dimensional printed object.

Next, a flow of a process in which the energy of light to be output from the projector 31 is adjusted by the controller 16 will be described with reference to the flow chart of FIG. 6. The description herein is directed to an example in which a three-dimensional printed object 86 shown in FIG. 7 is printed.

First, in step S11, cross-sectional shapes of the three-dimensional printed object 86 to be printed are prepared. In step S11, the creating section 50 creates cross-sectional shapes of the three-dimensional printed object 86. Herein, the creating section 50 creates data of cross-sectional shapes for 100 layers, for example, into which the three-dimensional printed object 86 shown in FIG. 7 is sliced. Note that there is no particular limitation on the number of layers that the three-dimensional printed object 86 is sliced into when creating data of cross-sectional shapes.

In step S13, the controller 16 reads out data of each cross-sectional shape created by the creating section 50.

In step S15, based on data of each cross-sectional shape created by the creating section 50, the specifying section 52 determines the to-be-printed area 82 (see FIG. 4) which is actually to be irradiated with light of the projector 31 within the print area 80 of the vat 12 (see also FIG. 2) which is available to be irradiated with light of the projector 31.

Figure 8:
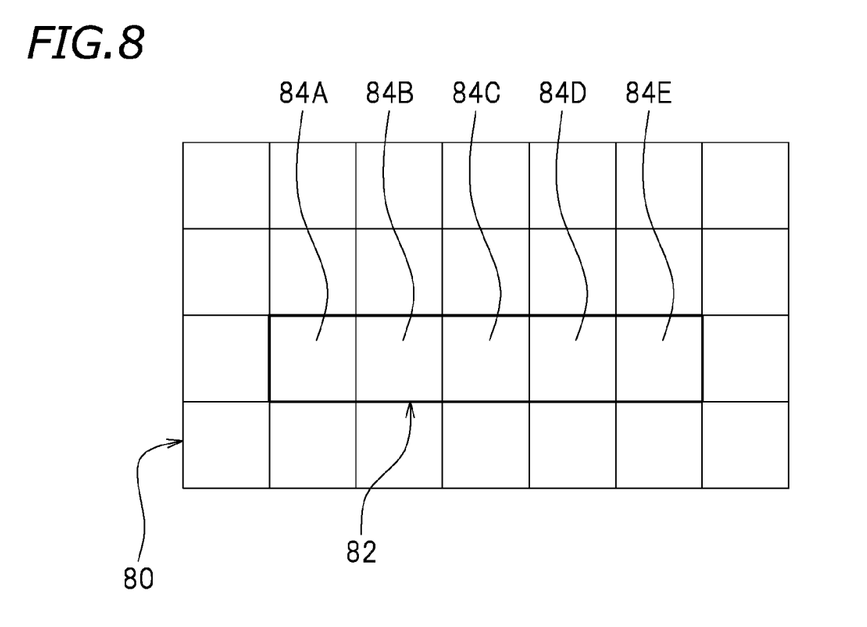
FIG. 8 is a diagram showing an example where a to-be-printed area is specified in the print area which has been divided into a plurality of blocks.

In step S17, the dividing section 54 divides the print area 80 into a plurality of blocks 84. Thus, as shown in FIG. 8, the to-be-printed area 82 is divided into a first block 84A, a second block 84B, a third block 84C, a fourth block 84D, and a fifth block 84E.

In step S19, based on data of each cross-sectional shape created by the creating section 50, the controller 16 irradiates the photo-curable resin 23 with light from the projector 31 for each of the blocks 84 divided by the dividing section 54. In step S19, after printing apiece whose shape corresponds to data of a cross-sectional shape read out in step S13, the cured photo-curable resin 23 is pulled up by the holder 13 out of the vat 12. An intended three-dimensional printed object is printed by curing the photo-curable resin 23 to print a resin layer whose shape corresponds to a cross-sectional shape, as described above, and successively depositing such printed resin layers.

In step S21, the controller 16 determines whether or not the printing of the three-dimensional printed object 86 has been completed. If it is determined in step S21 that the printing of the three-dimensional printed object 86 has been completed, the controller 16 ends adjusting the energy of light to be output from the projector 31. On the other hand, if it is determined that the printing of the three-dimensional printed object 86 has not been completed, control proceeds to step S23.

In step S23, the counting section 56 counts the number of times each of the blocks 84 divided by the dividing section 54 has been irradiated with light of the projector 31. Until a predetermined threshold value is reached, each of the divided blocks 84 is irradiated with light having the first energy from the projector 31.

Figure 9:
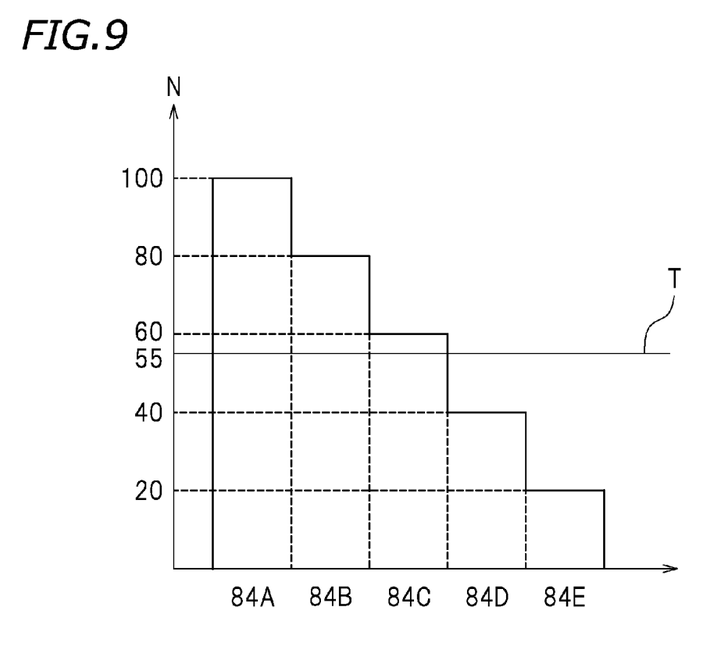
FIG. 9 is a graph showing the number of times the blocks of the to-be-printed area are each irradiated with light.

In step S25, for each of the divided blocks 84, the first determination section 58 determines whether or not the number of times counted by the counting section 56 has reached the predetermined threshold value. In step S25, if it is determined that the number of times counted by the counting section 56 has reached the predetermined threshold value, control proceeds to step S27. On the other hand, if it is determined that the number of times counted by the counting section 56 has not reached the predetermined threshold value, control returns to step S19. Since the first determination section 58 makes the determination for each of the blocks 84, one block 84 may have reached the predetermined threshold value while another block 84 has not reached the predetermined threshold value at a certain point while printing the three-dimensional printed object 86. Herein, the predetermined threshold value is preferably set to 55, for example, as shown in FIG. 9. Note that in FIG. 9, N denotes the number of times the blocks 84A to 84E of the to-be-printed area 82 are irradiated with light from the projector 31, and T denotes the predetermined threshold value.

In step S27, the light outputting section 60 changes, from the first energy to the second energy lower than the first energy, the energy of light to be output from the projector 31 to the photo-curable resin 23 of the block 84 for which determination has been made. That is, the energy of light to be output from the projector 31 to the photo-curable resin 23 of each block 84 other than the block for which determination has been made remains to be the first energy. After the light outputting section 60 sets the energy of light from the projector 31 to the second energy in step S27, control returns to step S19. That is, in step S19, the photo-curable resin 23 of the block 84 for which determination has been made is irradiated with light having the second energy from the projector 31. As shown in FIG. 9, for the fourth block 84D and the fifth block 84E, the number of times they have been irradiated with light from the projector 31 does not exceed the predetermined threshold value (55). Thus, the photo-curable resin 23 of the fourth block 84D and the fifth block 84E is always irradiated with light having the first energy from the projector 31. On the other hand, for the first block 84A, the second block 84B and the third block 84C, the number of times they have been irradiated with light from the projector 31 exceeds the predetermined threshold value. Until the predetermined threshold value (55) is reached, the photo-curable resin 23 is irradiated with light having the first energy from the projector 31. After the predetermined threshold value (55) is reached, (i.e., starting from the 56th light irradiation), the photo-curable resin 23 is irradiated with light having the second energy from the projector 31. Note that after changing, from the first energy to the second energy, the energy of light to be output from the projector 31 to the photo-curable resin 23 of the block 84 for which determination has been made in step S27, the light outputting section 60 may further lower the energy from the second energy in a stepwise manner. Alternatively, after changing, from the first energy to the second energy, the energy of light to be output from the projector 31 to the photo-curable resin 23 of the block 84 for which determination has been made, the light outputting section 60 may not change the energy of light from the projector 31 and may keep the light intensity of the second energy.

As described above, with the three-dimensional printing device 10, for the blocks 84A, 84B and 84C of the vat 12 which are irradiated with light from the projector 31 for a larger number of times when printing the three-dimensional printed object 86, the energy of light is changed by the light outputting section 60 to the second energy which is lower than the first energy when the number of times they have been irradiated with light exceeds the predetermined threshold value. Thus, with the light outputting section 60 adjusting the energy of light from the projector 31, it is possible to prevent the photo-curable resin 23 from curing excessively for the blocks 84A, 84B and 84C that are irradiated with light for a larger number of times. That is, even for the blocks 84A, 84B and 84C that are irradiated with light for a larger number of times, it is possible to sufficiently cure the photo-curable resin 23 and also to prevent the photo-curable resin 23 from curing excessively and scratching the silicone layer 30 of the vat 12. As a result, the clouding of the vat 12 is prevented.

With the three-dimensional printing device 10 of the present preferred embodiment, after the energy of light of the projector 31 is changed to the second energy by the light outputting section 60, the energy of light from the projector 31 may be lowered in a stepwise manner from the second energy as the number of times of irradiation with light of the projector 31 increases. Thus, it is possible to sufficiently cure the photo-curable resin 23 and also to prevent the photo-curable resin 23 from curing excessively. Moreover, it is possible to reduce, in a stepwise manner, the total amount of optical energy that is needed to print the three-dimensional printed object 86.

With the three-dimensional printing device 10 of the present preferred embodiment, after the energy of light of the projector 31 is changed to the second energy by the light outputting section 60, only light having the second energy may be output. Thus, it is possible to sufficiently cure the photo-curable resin 23 and also to prevent the photo-curable resin 23 from curing excessively. Since the energy of light to be output from the light outputting section 60 is either the first energy or the second energy, the control is easy.

With the three-dimensional printing device 10 of the present preferred embodiment, as shown in FIG. 9, the blocks 84A, 84B and 84C of the vat 12 which are irradiated with light from the projector 31 for a larger number of times when printing the three-dimensional printed object 86 are irradiated with light having the first energy and light having the second energy from the projector 31. That is, they are irradiated with light having the first energy until the predetermined threshold value is reached, and with light having the second energy after the predetermined threshold value is reached. Thus, it is possible to better prevent the photo-curable resin 23 from curing excessively. The blocks 84D and 84E of the vat 12 which are irradiated with light from the projector 31 for a smaller number of times when printing the three-dimensional printed object 86 are irradiated only with light having the first energy from the projector 31. For the blocks 84D and 84E which are irradiated with light for a smaller number of times, the photo-curable resin 23 will not cure excessively even if the light outputting section 60 does not change the energy of light to the second, lower energy.

Second Preferred Embodiment

In the preferred embodiment described above, the light outputting section 60 changes, from the first energy to the second energy, the energy of light to be output from the projector 31 to the photo-curable resin 23 of the block 84 for which determination has been made when the number of times counted by the counting section 56 reaches the predetermined threshold value. However, the present invention is not limited thereto.

In the preferred embodiment described above, when a three-dimensional printed object is printed while performing the control described above, the curing of the photo-curable resin 23 may be partially incomplete, depending on the characteristics of the material of the photo-curable resin 23 or the shape of the three-dimensional printed object to be printed. The inventor of the present application discovered that this phenomenon occurs particularly toward the end of the process of printing a three-dimensional printed object. The inventor of the present application discovered that by changing the energy of light with which the photo-curable resin 23 is irradiated by using an ingenious timing to adjust the energy of light from the light source, it is possible to sufficiently cure the photo-curable resin 23 of a portion that is printed toward the end of the process of printing the three-dimensional printed object and also to better prevent the photo-curable resin 23 of that portion from curing excessively.

Figure 10:
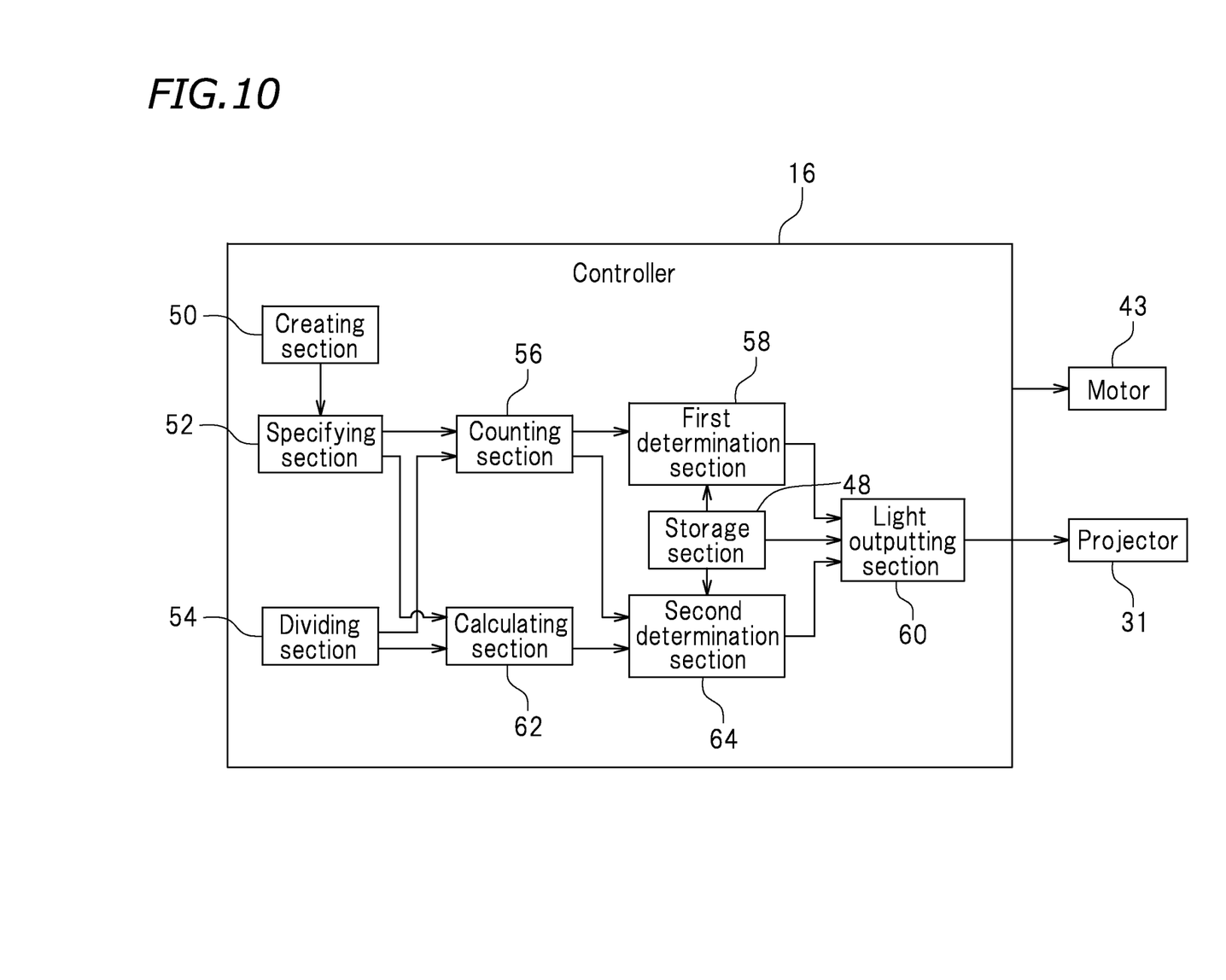
FIG. 10 is a block diagram showing primary components according to another preferred embodiment of the present invention.

As shown in FIG. 10, the controller 16 is configured or programmed to further include a calculating section 62 and a second determination section 64.

The calculating section 62 calculates the total number of times each of the blocks 84 divided by the dividing section 54 is irradiated with light of the projector 31. The calculating section 62 calculates, in advance before the start of the process of printing a three-dimensional printed object to be printed, the number of times each block 84 is irradiated with light, from beginning to end of the process of printing the three-dimensional printed object. Based on data of cross-sectional shapes created by the creating section 50, the calculating section 62 calculates the total number of times each block 84 is irradiated with light of the projector 31.

The second determination section 64 determines, for each block 84, whether or not the percentage of the number of times counted by the counting section 56 with respect to the total number of times calculated by the calculating section 62 has reached a predetermined percentage. The predetermined percentage is determined in advance. In the present preferred embodiment, the predetermined percentage is stored in advance in the storage section 48 of the controller 16. For example, the predetermined percentage is the percentage of the number of times of light irradiation such that even when the energy of light is changed from the first energy to the second energy lower than the first energy, the three-dimensional printed object is cured sufficiently and the shape thereof is able to be maintained sufficiently. For example, the predetermined percentage preferably is about 80% to about 95%.

The light outputting section 60 changes, from the first energy to the second energy, the energy of light to be output from the projector 31 to the photo-curable resin 23 of the block 84 for which determination has been made at whichever is a later point in time between when it is determined by the first determination section 58 that the number of times counted by the counting section 56 has reached the predetermined threshold value and when it is determined by the second determination section 64 that the percentage of the number of times counted by the counting section 56 with respect to the total number of times calculated by the calculating section 62 has reached the predetermined percentage.

The light outputting section 60 sets, to the first energy, the energy of light to be output from the projector 31, if the number of times counted by the counting section 56 has not reached the predetermined threshold value and the percentage of the number of times counted by the counting section 56 with respect to the total number of times calculated by the calculating section 62 has not reached the predetermined percentage. The light outputting section 60 sets, to the first energy, the energy of light to be output from the projector 31, if the number of times counted by the counting section 56 has reached the predetermined threshold value and the percentage of the number of times counted by the counting section 56 with respect to the total number of times calculated by the calculating section 62 has not reached the predetermined percentage. The light outputting section 60 sets, to the first energy, the energy of light to be output from the projector 31, if the percentage of the number of times counted by the counting section 56 with respect to the total number of times calculated by the calculating section 62 has reached the predetermined percentage and the number of times counted by the counting section 56 has not reached the predetermined threshold value.

Figure 11:
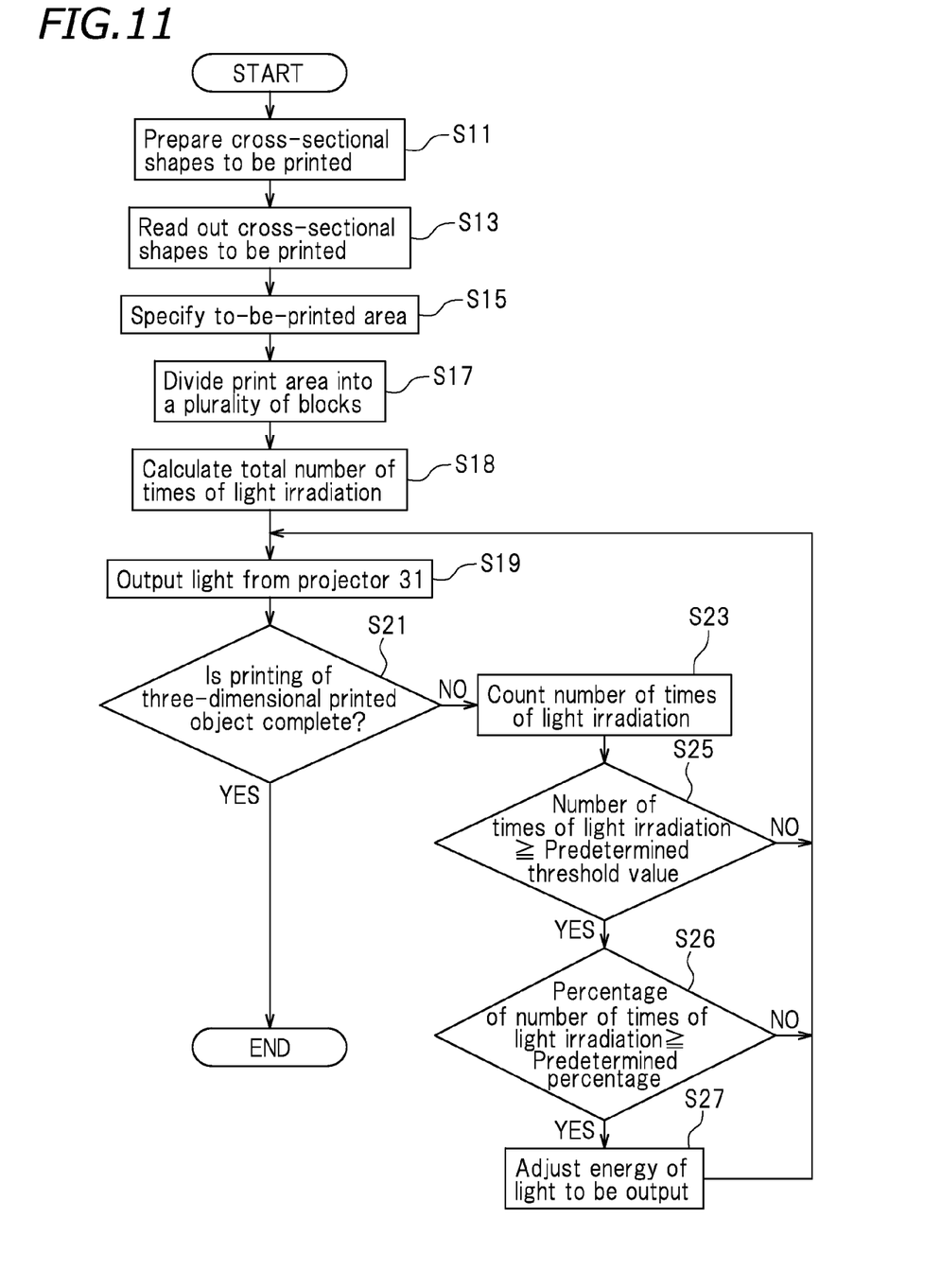
FIG. 11 is a flow chart showing the flow of a process of adjusting the energy of light to be output from the projector according to a preferred embodiment of the present invention.

Next, a flow of a process in which the energy of light to be output from the projector 31 is adjusted by the controller 16 will be described with reference to the flow chart of FIG. 11. Note that in FIG. 11, steps of performing the same processes as those of FIG. 6 will be denoted by the same reference signs and will not be described below. The description herein is directed to an example in which a three-dimensional printed object 86 shown in FIG. 7 is printed.

Figure 12:
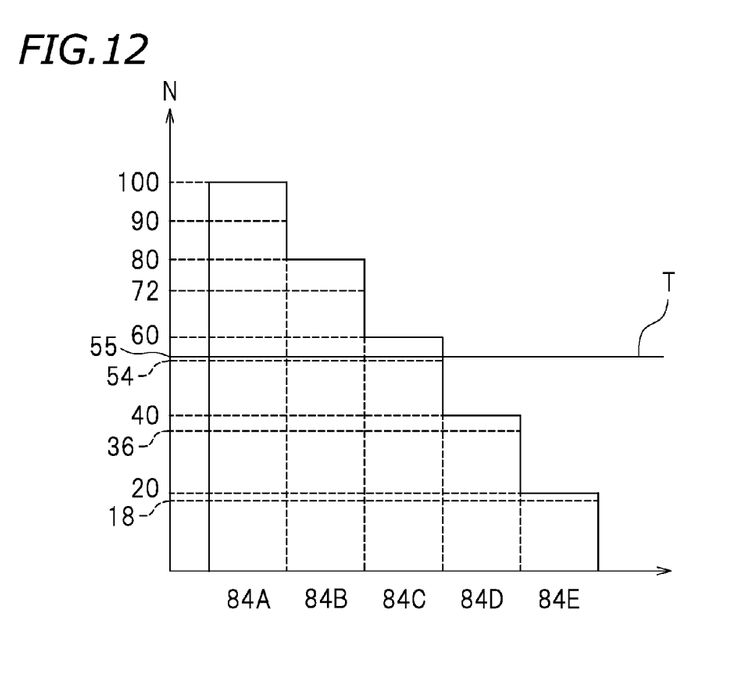
FIG. 12 is a graph showing the number of times the blocks of the to-be-printed area are each irradiated with light.

In step S18, the calculating section 62 calculates the total number of times each of the blocks 84 divided by the dividing section 54 is irradiated with light of the projector 31. As shown in FIG. 12, the number of times the first block 84A is irradiated with light is 100, the number of times the second block 84B is irradiated with light is 80, the number of times the third block 84C is irradiated with light is 60, the number of times the fourth block 84D is irradiated with light is 40, and the number of times the fifth block 84E is irradiated with light is 20.

In step S25, if it is determined that the number of times counted by the counting section 56 has reached the predetermined threshold value, control proceeds to step S26.

In step S26, the second determination section 64 determines, for each block 84, whether or not the percentage of the number of times counted by the counting section 56 with respect to the total number of times calculated by the calculating section 62 has reached the predetermined percentage. If it is determined in step S26 that the percentage has reached the predetermined percentage, control proceeds to step S27. On the other hand, if it is determined that the percentage has not reached the predetermined percentage, control returns to step S19. Since the second determination section 64 makes the determination for each of the blocks 84, one block 84 may have reached the predetermined percentage while another block 84 has not reached the predetermined percentage while printing the three-dimensional printed object 86. Herein, the predetermined percentage is preferably set to about 90%, as shown in FIG. 12.

As shown in FIG. 12, for the fourth block 84D and the fifth block 84E, the number of times they have been irradiated with light from the projector 31 does not exceed the predetermined threshold value (e.g., 55). Thus, the photo-curable resin 23 of the fourth block 84D and the fifth block 84E is always irradiated with light having the first energy. On the other hand, the third block 84C exceeds the predetermined percentage (e.g., about 90%) when the number of times it has been irradiated with light from the projector 31 is 54, and the third block 84C exceeds the predetermined threshold value (e.g., 55) when the number of times it has been irradiated with light from the projector 31 is 55. Thus, until the predetermined threshold value (55) is reached, the photo-curable resin 23 is irradiated with light having the first energy, and after the predetermined threshold value (55) is reached (i.e., starting from the 56th light irradiation), the photo-curable resin 23 is irradiated with light having the second energy.

The second block 84B exceeds the predetermined threshold value (55) when the number of times it has been irradiated with light from the projector 31 is 55, and exceeds the predetermined percentage (e.g., about 90%) when the number of times it has been irradiated with light from the projector 31 is 72. Therefore, until the predetermined percentage is reached (i.e., until the number of times it has been irradiated with light is 72), the photo-curable resin 23 is irradiated with light having the first energy, and after the predetermined percentage is reached (i.e., starting from the $73^{rd}$ light irradiation), the photo-curable resin 23 is irradiated with light having the second energy. Moreover, the first block 84A exceeds the predetermined threshold value (55) when the number of times it has been irradiated with light from the projector 31 is 55, and exceeds the predetermined percentage (e.g., about 90%) when the number of times it has been irradiated with light from the projector 31 is 90. Therefore, until the predetermined percentage is reached (i.e., until the number of times it has been irradiated with light is 90), the photo-curable resin 23 is irradiated with light having the first energy, and after the predetermined percentage is reached (i.e., starting from the $91^{st}$ light irradiation), the photo-curable resin 23 is irradiated with light having the second energy.

With the three-dimensional printing device 10 of the present preferred embodiment, for the blocks 84A and 84B of the vat 12 which are irradiated with light from the projector 31 for a larger number of times when printing the three-dimensional printed object 86, the light outputting section 60 changes the energy of light to the second energy lower than the first energy when the number of times they have been irradiated with light exceeds the predetermined percentage. For the block 84C, the light outputting section 60 changes the energy of light to the second energy lower than the first energy when the number of times it has been irradiated with light exceeds the predetermined threshold value. Thus, with the light outputting section 60 adjusting the energy of light from the projector 31, it is possible to sufficiently cure the three-dimensional printed object 86 for the blocks 84A, 84B and 84C that are irradiated with light for a larger number of times, and also to prevent the photo-curable resin from curing excessively particularly toward the end of the printing process.

With the three-dimensional printing device 10 of the present preferred embodiment, as shown in FIG. 12, the timing at which the energy of light to be output from the projector 31 is changed to the second energy lower than the first energy varies between the blocks 84A, 84B and 84C of the vat 12 which are irradiated with light from the projector 31 for a larger number of times when printing the three-dimensional printed object 86. Thus, it is possible to appropriately cure the photo-curable resin 23 for each of the blocks 84A, 84B and 84C, and also to prevent the clouding of the resin vat.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing device for printing a three-dimensional printed object by preparing cross-sectional shapes of the three-dimensional printed object and curing a photo-curable resin so as to successively deposit resin layers of the cross-sectional shapes, the three-dimensional printing device comprising:
  a vat made of a resin material and containing the photo-curable resin therein;
  an optical device disposed below the vat and including at least alight source that outputs light to irradiate the photo-curable resin contained in the vat with light from the light source; and
  a controller that controls the optical device and is configured or programmed to include:
  a dividing section that divides an area of the vat that is irradiated with light from the light source into a plurality of blocks;
  a counting section that counts a number of times each of the blocks divided by the dividing section has been irradiated with light from the light source;
  a first determination section that determines whether or not the number of times counted by the counting section has reached a predetermined threshold value; and
  a light output section that, when it is determined by the first determination section that the number of times has not reached the threshold value, sets to a first energy an energy of light to be output from the light source to the photo-curable resin of the block for which determination has been made, and when it is determined by the first determination section that the number of times has reached the predetermined threshold value, the light output section changes, from the first energy to a second energy lower than the first energy, the energy of light to be output from the light source to the photo-curable resin of the block for which determination has been made.

2. The three-dimensional printing device according to claim 1, wherein
  the controller is configured or programmed to include a calculating section that calculates a total number of times each of the blocks divided by the dividing section is irradiated with light from the light source, and a second determination section that determines whether or not a percentage of the number of times counted by the counting section with respect to the calculated total number of times has reached a predetermined percentage; and
  the light output section changes, from the first energy to the second energy, the energy of light to be output from the light source to the photo-curable resin of the block for which determination has been made at whichever is a later point in time between when it is determined by the first determination section that the number of times has reached the predetermined threshold value and when it is determined by the second determination section that the percentage has reached the predetermined percentage.

3. The three-dimensional printing device according to claim 1, wherein after changing from the first energy to the second energy the energy of light to be output from the light source to the photo-curable resin of the block for which determination has been made, the light output section lowers the energy of light from the light source in a stepwise manner from the second energy as the number of times the block for which determination has been made has been irradiated with light from the light source increases.

4. The three-dimensional printing device according to claim 1, wherein after the energy of light to be output from the light source to the photo-curable resin of the block for which determination has been made is changed from the first energy to the second energy by the light output section, the light source irradiates the photo-curable resin of the block for which determination has been made only with light having the second energy.

5. The three-dimensional printing device according to claim 1, wherein
  the plurality of blocks include a first block, and a second block that is irradiated with light from the light source for a larger number of times than the first block;

the first block is irradiated only with light having the first energy; and the second block is irradiated at least with light having the first energy and light having the second energy.

6. The three-dimensional printing device according to claim 1, wherein the plurality of blocks include a first block, and a second block that is irradiated with light from the light source for a larger number of times than the first block;

the first block and the second block are irradiated with light having the first energy and light having the second energy; and a timing at which light to irradiate the first block is changed from light having the first energy to light having the second energy is earlier than a timing at which light to irradiate the second block is changed from light having the first energy to light having the second energy.

\* \* \* \* \*